United States Patent [19]

Amason et al.

[11] 3,989,984

[45] Nov. 2, 1976

[54] AIRCRAFT LIGHTNING PROTECTION MEANS

[75] Inventors: Myron P. Amason, Stanton; Joseph T. Kung, Long Beach, both of Calif.

[73] Assignee: McDonnell Douglas Corporation, Long Beach, Calif.

[22] Filed: July 11, 1975

[21] Appl. No.: 595,047

[52] U.S. Cl. .............................. 317/2 E; 317/262 R; 244/1 A
[51] Int. Cl.² ........................................... H05F 1/02
[58] Field of Search ....................... 317/2 E, 262 R; 244/1 A

[56] References Cited
UNITED STATES PATENTS

| | | | |
|---|---|---|---|
| 3,532,932 | 10/1970 | Simon | 317/262 R X |
| 3,755,713 | 8/1973 | Paszkowski | 317/2 E |

*Primary Examiner*—R. N. Envall, Jr.
*Attorney, Agent, or Firm*—D. N. Jeu; Walter J. Jason; Donald L. Royer

[57] ABSTRACT

Lightning protection means for aircraft structural components includes thin, perforated, dielectric and metallic layers applied to the ordinarily lightning-accessible surfaces of composite structures. Where the outer metallic layer of the lightning protection means is formed from sprayed metal, ground connection means to the metallic layer preferably comprises a section of wire screen fused with the sprayed metal on the dielectric layer, a thin metal plate brazed to the wire screen, and a metal attachment connecting the metal plate to adjacent ground structure. Composite-to-metal or composite-to-composite structural joints are protected by making the entire bonded and bolted interface areas conductive for transfer of lightning current, or by isolating the bonded interface area to control the transfer path of the lightning current through the bolted interface area only.

16 Claims, 11 Drawing Figures

AIRCRAFT LIGHTNING PROTECTION MEANS

BACKGROUND OF THE INVENTION

Our present invention pertains generally to the field of lightning protection means for aircraft and other vehicles. More particularly, the invention relates to lightning protection means for composite structures on aircraft or other vehicles.

Advanced (boron and graphite epoxy) composite materials are being increasingly used to replace conventional metals in various aircraft structural components since significant weight savings can be achieved. These composite materials are not electrically nor thermally as conductive as conventional metals, however, and lightning strikes on composite components can seriously degrade the structural integrity of such components. The weight factor is the most important design consideration for aircraft composite structures, and certain prior lightning protection systems of others are not applicable to composite aircraft structures due to the unacceptable weight penalty imposed.

In our copending U.S. patent application Ser. No. 401,388 filed Sept. 27, 1973 for Aircraft Lightning Protection System, now U.S. Pat. 3,906,308 there is disclosed and claimed a lightning protection system utilizing dielectric materials in the form of coatings and/or films applied to critical composite or metallic components located at the external surface of an aircraft to provide a complete dielectric shield which protects the components from lightning channel attachments. For large span skin panel protection, properly oriented and spaced foil or solid metal strips of appropriate dimensions are additionally affixed to the surface of the dielectric material on the skin panel and grounded to provide dwell points for the lightning channel.

While the aircraft lightning protection system described and illustrated in the U.S. application Ser. No. 401,388 identified above is fully applicable for use on composite aircraft components, there are some composite components which have certain characteristics or requirements that may make such lightning protection system difficult to use or even prohibit its use. For example, a composite component may have unusually sharp contours and high curvatures in more than one direction so that a desired dielectric film shield cannot be easily applied correctly to the surface of the component. A composite skin panel may have antenna ground plane or electromagnetic interference (EMI) and electromagnetic pulse (EMP) protection requirements which cannot be met by the noted lightning protection system.

Closely related to the structural integrity of aircraft composite structures are their connecting joints. Structural joints are clearly fundamental elements of the structure of an aircraft. It is vitally important that the strength of these structural joints not be degraded during a lightning strike incident. The conventional metal-to-metal structural joints have relatively low resistance and are not normally vulnerable to lightning damage from transferring lightning current through such joints. This is not the case, however, for the composite-to-metal and composite-to-composite structural joints. There is presently no known means, system, or process in the industry which can be used with, or applied to, composite-to-metal and composite-to-composite structural joints to reduce their vulnerability to lightning strike damage.

SUMMARY OF THE INVENTION

Briefly, and in general terms, our invention is preferably accomplished by providing conformable and lightweight lightning protection means including thin, perforated, dielectric and metallic layers of materials which can be easily applied to the surface of composite structural components to protect them from being damaged by lightning strikes thereon. The perforated lightning protection means is affixed so that its dielectric layer is bonded to the surface of the composite structure and the metallic layer is bonded to the outer surface of the dielectric layer. The metallic layer is suitably grounded, and an environmental protection coating such as polyurethane paint can be applied over the thin metallic layer as required.

The thin metallic layer of the perforated lightning protection means will satisfy any antenna ground plane or electromagnetic interference and electromagnetic pulse protection requirements. When struck by lightning through any environmental coating, the thin metallic layer vaporizes locally while the rest of the remaining relatively large area thereof transfers the lightning current away from the struck area without damage. At the same time, the thin dielectric layer provides both electrical and thermal isolation protection for the covered composite structure. After a lightning strike, the protection means is still normally workable and the relatively small vaporized metallic area generally requires no repair or rework except for surface repaint. In maintenance, the area of the metallic layer vaporized by a lightning strike is usually only a few inches wide and need not be repaired as long as the inner dielectric layer is not functionally damaged.

Where the outer metallic layer of the perforated lightning protection means is formed from sprayed metal, ground connection means to the metallic layer preferably comprises a section of wire screen fused to the dielectric layer by the sprayed metal, a thin metal plate which was dip brazed to the wire screen, and a bolt and nut connecting the metal plate to nearby ground structure. The fusing of the wire screen with the sprayed metal on the dielectric layer produces an intimate and widely distributed electrical contact between the metallic layer and the metal plate which can be solidly grounded. This type of ground connection means greatly reduces the corrosion problems encountered with ordinary grounding devices. It can, of course, be readily adapted for use in various other forms of electrical connections involving sprayed metal layers including those used for example on antenna element surfaces.

Composite-to-metal or composite-to-composite structural joints can be rendered less vulnerable to damage from lightning strikes, when the perforated lightning protection means is not used on the associated composite structures, by making the entire bonded and bolted interface areas conductive for transfer of lightning current or by isolating the bonded interface area to control the transfer path of the lightning current through the bolted interface area only. In an extensive test program on 90 structural joint samples, test results indicated that graphite epoxy composite maaterial has good lightning current transfer characteristics and that boron epoxy composite material can also transfer a limited amount of lightning current well.

From an investigation of various bonding interface designs with composite structures, the above-noted conductive and semi-isolation joint protection methods were found to utilize to greatest advantage the electrically conductive characteristics of boron and graphite epoxy composite materials.

In both the conductive and semi-isolation joint protection methods, a bonding interface layer is introduced in the joint area between mating composite and metal or composite and composite structures (panels). In the conductive joint protection method, the interface layer can be a graphite composite layer with a thin conductive chemical coating or a thin metal plating covering sanded graphite filaments. This interface layer is normally fabricated bonded to its associated composite panel with the coating or plating exposed. In the semi-isolation joint protection method, the interface layer can be a thin dielectric film bonded in the joint area between the mated composite and metal or composite and composite panels. The surfaces of the semi-isolation joint fastening means (bolt, nut, etc.) are also prepared with a chemical coating so that they are more conductive and noncorrosive.

BRIEF DESCRIPTION OF THE DRAWINGS

Our invention will be more fully understood, and other advantages and features thereof will become apparent, from the following description of certain exemplary embodiments of the invention. The description is to be taken in conjunction with the accompanying drawings, in which.

DESCRIPTION OF THE PRESENT EMBODIMENTS

In the following description and accompanying drawings of certain exemplary embodiments of our invention, some specific dimensions and types of materials are disclosed. It is to be understood, of course, that such dimensions and types of materials are given as examples only and are not intended to limit the scope of this invention in any manner.

Figure 1:
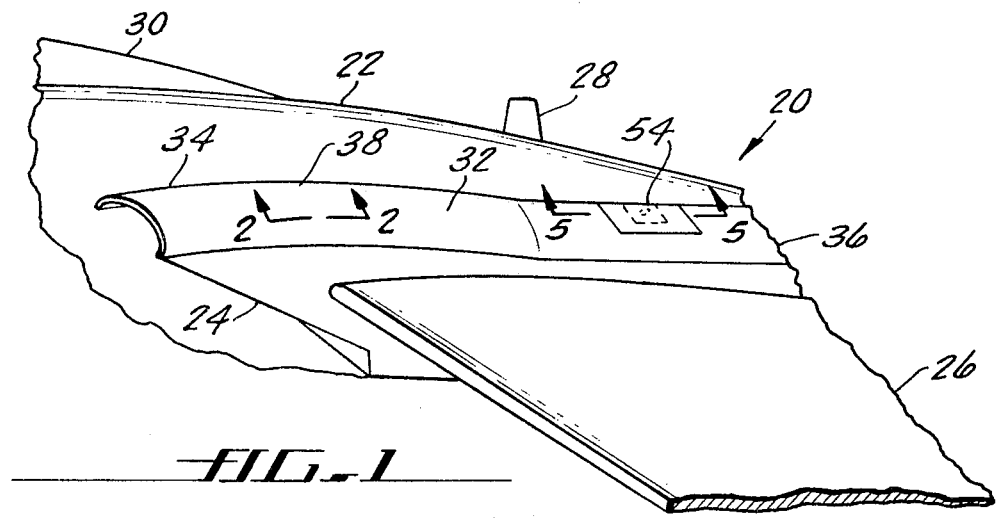
FIG. 1 is a fragmentary perspective view of one side of an aircraft, including portions of its fuselage, engine inlet duct structure and wing.

FIG. 1 is a fragmentary perspective view of one side of an aircraft 20 including portions of its fuselage 22, engine inlet duct structure 24, and wing 26. An antenna mast 28 is mounted on the fuselage 22 behind cockpit 30 and projects a suitable height above the upper surface of the fuselage. The duct structure 24 has an upper wall 32 which is positioned longitudinally adjacent to the side of the fuselage 22 and extends laterally from it. In this particular instance, the forward portion 34 of the upper duct wall 32 is convexly curved both longitudinally and laterally whereas the aft portion 36 is generally flat. The upper duct wall 32, for example, can have a construction incorporating a lightning protection means 38 in accordance with this invention.

Figure 2:
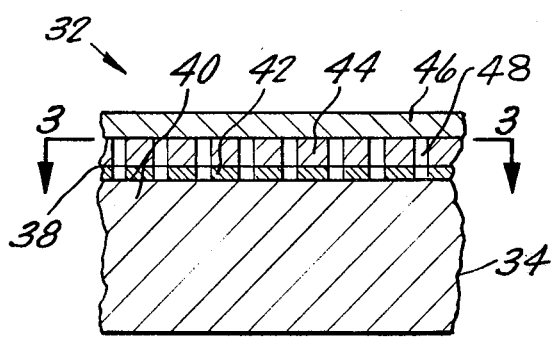
FIG. 2 is a fragmentary sectional view of part of the upper wall of the engine inlet duct structure as taken along the curved line 2—2 indicated in FIG. 1.

FIG. 2 is a fragmentary sectional view of part of the forward portion 34 of the upper duct wall 32 as taken along the curved line 2—2 indicated in FIG. 1. The duct wall 32 includes a composite skin panel 40, a thin dielectric layer 42, a thin metal layer 44, and usually a surface paint layer 46. The thin dielectric layer 42 can be adhesively bonded to the composite panel 40 using the basic matrix resin thereof or a suitable adhesive layer (not shown). The thin metal layer 44 can be affixed in the same manner to the dielectric layer 42. The composite panel 40 can be made of boron or graphite epoxy composite material, the dielectric layer 42 can be of epoxy resin or Kapton film, and the metal layer 44 can be sprayed aluminum or aluminum foil, for example. The paint layer 46 can be standard polyurethane external surface paint.

The lightning protection means 38 for the composite skin panel 40 includes the thin dielectric layer 42 and the thin metal layer 44. The surface paint layer 46 is not an essential part of this protection means 38 but must be considered because of its effect on the vaporizing pressure in the thin metal layer 44 when the duct wall 32 is struck by lightning. The paint layer 46 normally averages 3 mils in thickness. The thickness of the dielectric layer 42 generally ranges from 0.5 to 2 mils and the metal layer 44 generally ranges from 2 to 4 mils, approximately. Overall thickness of the protection means 38 ranges from about 3 to 5 mils.

Figure 3:
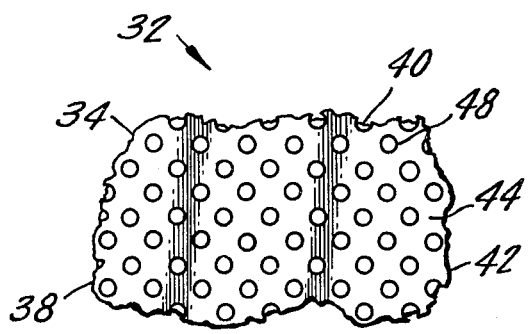
FIG. 3 is a fragmentary plan view of the part of the upper duct wall as taken along the line 3—3 indicated in FIG. 2.

The thin dielectric layer 42 can be a dielectric film which is resin-bonded or adhesive-bonded to the composite panel 40, and the thin metal layer 44 can be a metallic foil similarly resin-bonded or adhesive-bonded to the dielectric film layer. Alternatively, the thin dielectric layer 42 can be formed by spraying resin (or adhesive) over the composite panel 40 and then spraying (flame spray or plasma spray) aluminum over the resin layer to form the thin metal layer 44. Design criteria for this lightning protection means 38 on, for example, aircraft involve appropriate consideration of system weight penalty, dielectric strength, and vaporizing pressure in the thin metal layer 44 when struck by lightning. Normally, the total thickness of the protection means 38 should be less than about 5 mils to be acceptable from the system weight penalty point of view as considered relative to use on aircraft. Test data have shown that lightning protection means 38 using thicknesses of 2.5 mils aluminum foil and 1 mil Kapton film is satisfactory for aircraft. Protection means 38 with thicknesses of 4 mils spray aluminum and 1 mil epoxy resin is also satisfactory on aircraft. FIG. 3 is a fragmentary plan view of the part of the forward portion 34 of the upper duct wall 32 as taken along the line 3—3 indicated in FIG. 2. The lightning protection means 38 for the composite skin panel 40 can be perforated as illustrated. The bonded dielectric and metal layers 42 and 44 of the protection means 38 are punched through with small holes or apertures 48 and then suitably affixed to the composite panel 40. The permissible range of aperture or hole size depends upon the specific application of the protection means 38. It ranges, for example, from 0.045 to 0.250 inch diameter for normal usage on aircraft. The thickness of the bonded layers 42 and 44 ordinarily will not have much effect upon the aperture or hole size requirement.

The spacing between the diagonal rows of apertures 48 (the center-to-center spacing between closest apertures 48) similarly depends upon the specific application. It can range, for example, from 0.09 to 0.50 inch for normal aircraft usage. Of course, both the size and spacing of the apertures 48 can be varied as desired or required in any region of the lightning protection means 38. The circular apertures 48 in the protection means 38 reduce its weight and give its bonded layers 42 and 44 a considerable degree of flexibility in all directions. This protection means 38 is well suited for use on areas such as the aft duct portion 36 (FIG. 1) which is generally flat and the forward duct portion 34 which is both longitudinally and laterally curved to a fairly high degree. There can be certain instances, however, wherein an area such as the forward duct portion 34 may have a much higher curvature in one direction than in the other so that the protection means 38 with circular apertures 48 cannot be easily applied to such an area.

Figure 2A:
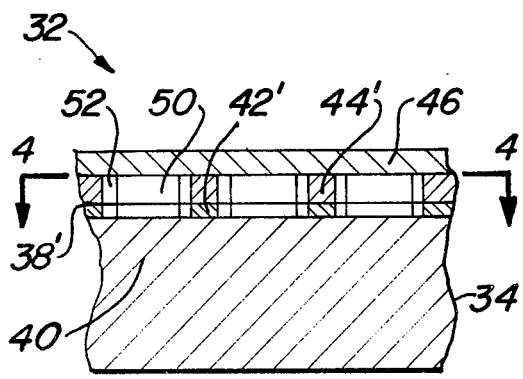
FIG. 2A is a fragmentary sectional view similar to that of FIG. 2 but showing a variation of the part of the upper duct wall.

FIG. 2A is a fragmentary sectional view similar to that of FIG. 2 but showing a variation of the part of the forward portion 34 of the upper duct wall 32. This variation of duct wall 32 includes composite skin panel 40, modified lightning protection means 38′ comprising a thin dielectric layer 42′ and a thin metal layer 44′, and usually surface paint layer 46. As described below, the protection means 38′ comprising the bonded dielectric and metal layers 42′ and 44′ can be perforated with narrow slots 50 having rounded ends 52.

Figure 4:
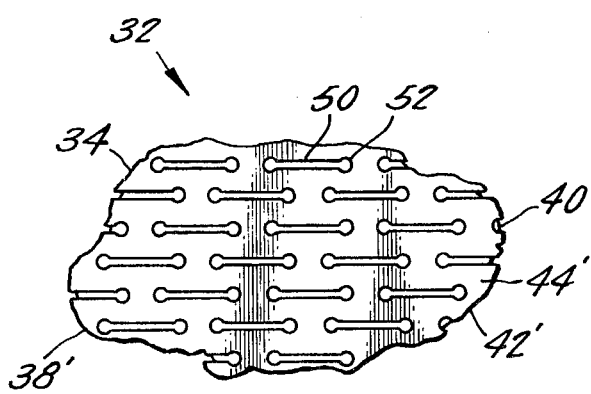
FIG. 4 is a fragmentary plan view of a modification of the part of the upper duct wall as taken along the line 4—4 indicated in FIG. 2A.

FIG. 4 is a fragmentary plan view of the part of the forward portion 34 of the upper duct wall 32 as taken along the line 4—4 indicated in FIG. 2A. In this instance, however, modified lightning protection means 38′ is used with the composite skin panel 40 (FIG. 2). The composite panel 40 has a much higher curvature laterally than longitudinally, and the protection means 38′ including the bonded dielectric and metal layers 42′ and 44′ can be perforated with narrow slots 50 to facilitate proper installation of the bonded dielectric and metal layers on the composite panel. Of course, the slots 50 are oriented longitudinally with the length of the forward duct portion 34. The slots 50 are terminated with rounded ends 52 to prevent or reduce any cracking or tearing of the bonded layers 42′ and 44′ at the slot ends during handling prior to attachment to the composite panel 40.

For normal aircraft usage, the narrow slots 50 can have a length in the range from 0.125 to 0.250 inch and a width in the range from 0.005 to 0.015 inch, for example. Adjacent ends 52 of the slots 50 in a row can be spaced in the range of about 0.125 to 0.250 inch, and adjacent rows of the slots can also be spaced in the range of about 0.125 to 0.250 inch. It should be noted that the perforated protection means with apertures 48 (FIG. 3) or slots 50 (FIG. 4) provides emission or exit openings for resin bleeding from the composite panel 40 during the bonding and curing process. This allows the perforated protection means to be contiguously and smoothly affixed throughout to the composite panel 40. The apertures 48 and slots 50 are, of course, generally filled with resin after the curing process. This produces a further locking effect between the lightning protection means and the composite panel 40. The resin generally filling the apertures 48 and slots 50 has not been shown in FIGS. 2 and 2A for clarity of illustration.

When the thin metal layer 44 (FIG. 3) or 44′ (FIG. 4) is aluminum foil, for example, grounding of the foil material can be accomplished by joining the foil material to ground structure through a bolt and nut joint connection. A suitable metal washer and metal bushing can be included in the joint connection to improve the electrical contact between the foil material and the ground structure. When the thin metal layer 44 or 44′ is sprayed aluminum, however, a bolt and nut grounding connection between the sprayed metal material and a ground structure is often tenuous and deteriorates rapidly due largely to corrosion that usually develops in the electrical joint.

Figure 5:
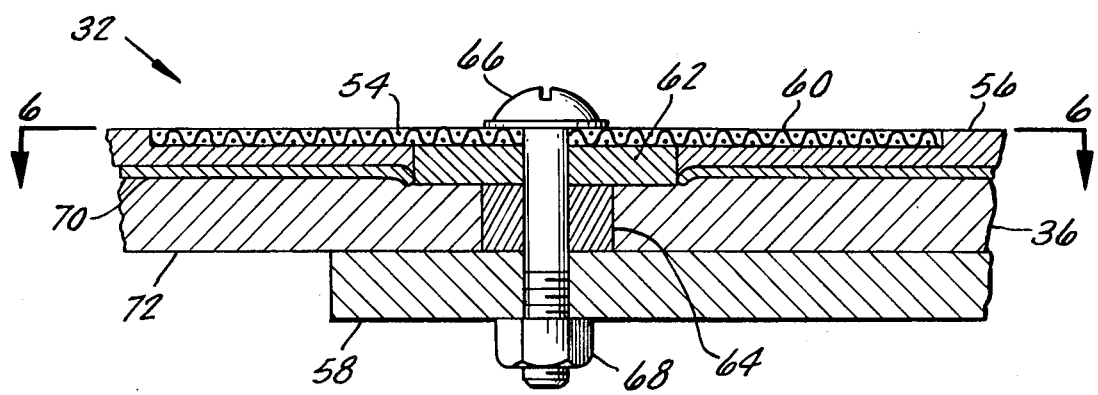
FIG. 5 is a fragmentary sectional view of another part of the upper wall of the engine inlet duct structure as taken along the line 5—5 indicated in FIG. 1.

FIG. 5 is a fragmentary sectional view of part of the aft portion 36 of the upper duct wall 32 as taken along the line 5—5 indicated in FIG. 1. Grounding connection means 54 is provided to connect a sprayed metal layer 56 to ground structure 58. The grounding means 54 includes a section of metal wire screen 60, a small metal plate 62, metal bushing 64, bolt 66, and nut 68. The plate 62 is preferably first attached to the screen 60 as by dip brazing, and the screen with attached plate can then be suitably positioned in a mold coated with a release agent and flame sprayed with aluminum to form the metal layer 56. At least the exposed portions of screen 60 not covered by the plate 62 are coated with aluminum spray to produce an extended and fused connection with the sprayed metal layer 56.

A dielectric layer 70 of epoxy resin can be next applied to the sprayed metal layer 56 for adhesion purposes. Composite laminates are laid up over the resin dielectric layer 70 and cured to form a panel 72 which is bonded to the sprayed metal layer 56 by the adhesive dielectric layer. The wire screen 60, metal plate 62, and composite panel 72 are then drilled through with a hole to allow passage of the shank of bolt 66. The panel 72 is, however, preferably drilled through with a larger hole to accommodate the metal bushing 64 which provides greater metal contact and better conduction between the metal plate 62 and ground structure 58. Of course, the ground structure 58 is also drilled through with a hole to pass the threaded shank end of bolt 66 so that the nut 68 can be properly fastened to the bolt.

Figure 6:
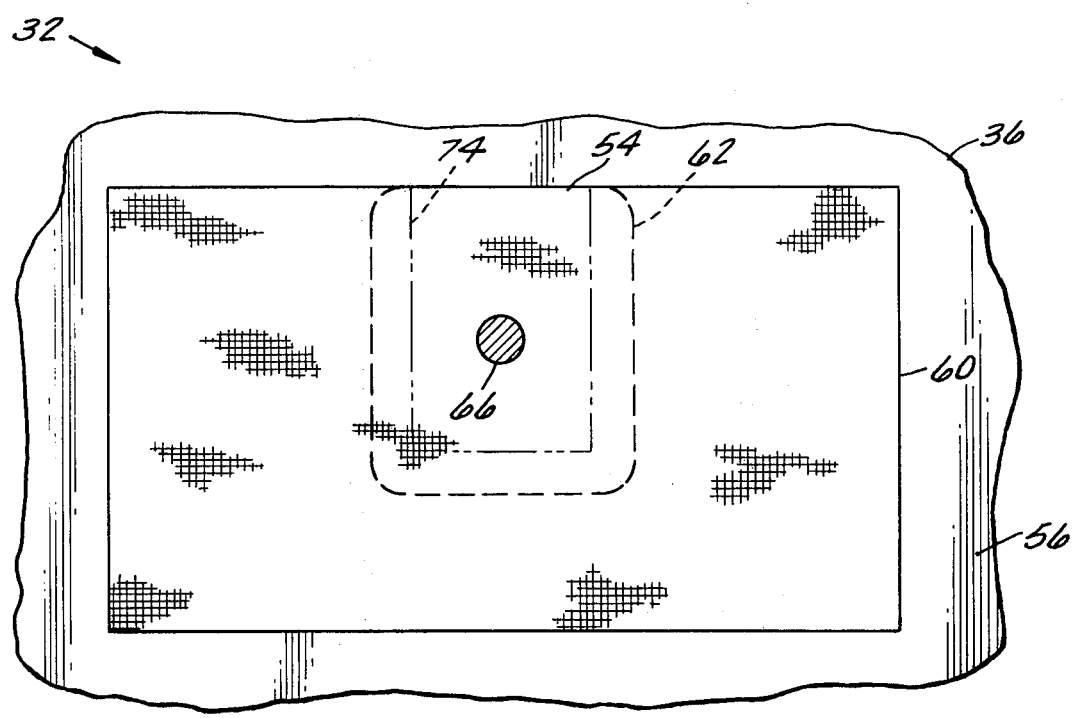
FIG. 6 is a fragmentary plan view of the other part of the upper duct wall including ground connection means as taken along the line 6—6 indicated in FIG. 5.

FIG. 6 is a fragmentary plan view of the aft duct portion 36 including the grounding connection means 54 as taken along the line 6—6 indicated in FIG. 5. The wire screen 60 is, for example, 6 inches long and 3 inches wide of 120 × 120 mesh 0.004 inch diameter aluminum wire. The small plate 62 is a thin aluminum plate 0.020 to 0.080 inch thick and 2 inches by 2 inches, for example, positioned with one edge aligned with an edge of the screen 60. If desired, the part of the screen 60 within the phantom lines 74 can be cut out prior to dip brazing the plate 62 to the screen 60. This will reduce the weight a bit and allow the head of bolt 66 to contact the plate 62 directly. Of course, the plate 62 can equally well be located on the upper or outer surface of the affixed screen 60 either with or without the screen part within the phantom lines 74 removed.

The grounding connection means 54 illustrated in FIG. 5 is normally used for connecting a sprayed metal layer 56 to ground structure 58, and the screen 60 is fused to the sprayed metal layer during formation thereof. Where the dielectric layer 70 is epoxy resin, for example, apertures 48 (FIG. 3) or slots 50 (FIG. 4) cannot be easily or desirably produced in the protection means including the sprayed metal layer 56 and resin dielectric layer 70. The dielectric layer 70, however, can be of film material and screen 60 with its brazed plate 62 can be fused to the sprayed metal layer 56 during spray formation thereof. This protection means including a sprayed metal layer and dielectric film layer can then be suitably perforated with apertures or slots in the areas desired or required.

Figure 7:
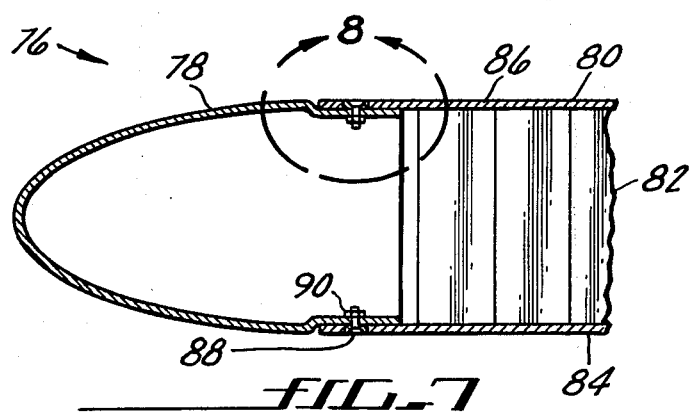
FIG. 7 is a fragmentary sectional view of a horizontal stabiliizer including a metal leading portion and a composite trailing portion with a honeycomb core.

FIG. 7 is a fragmentary sectional view of, for example, a horizontal stabilizer 76 including a metal leading portion 78 and a composite trailing portion 80 with a honeycomb core 82. The leading portion 78 can be made of aluminum, for example, and the trailing portion 80 can have composite panels 84 which are covered by lightning protection means 86. The core 82 can be a Nomex (specially treated kraft paper) or alumunium honeycomb core. The leading portion 78 can be secured to the trailing portion 80 by bolts 88 and nuts 90. The metal leading portion 78 is a ground structure, and the bolts 88 and nuts 90 additionally serve as electrical connections between the protection means 86 and the leading portion ground structure.

Figure 8:
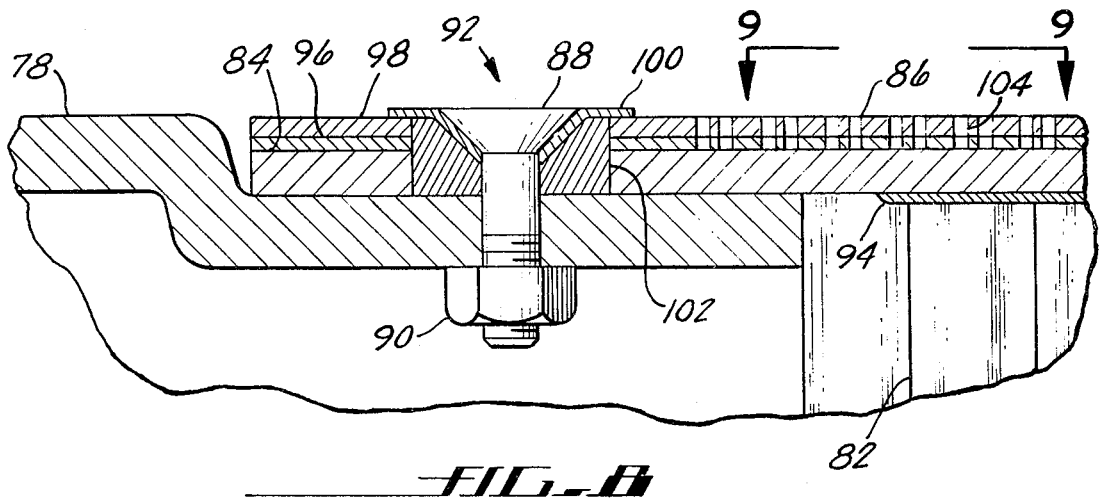
FIG. 8 is a fragmentary enlarged view of a joint portion of the horizontal stabilizer as taken along the line 8—8 indicated in FIG. 7.

FIG. 8 is a fragmentary enlarged view of the joint portion 92 of the horizontal stabilizer 76 as taken along the line 8—8 indicated in FIG. 7. The honeycomb core 82 can be bonded to composite panel 84 by a layer of adhesive 94. The protection means 86 includes, for example, a Kapton film dielectric layer 96 and an aluminium foil outer layer 98. Metal washer 100 and metal bushing 102 are preferably included in the joint connection to improve electrical contact and increase the current conduction area between the outer foil layer 98 and leading portion ground structure 78. When the film layer 96 and foil layer 98 are applied to and cured on the composite panel 84 bonded by adhesive layer 94 to the honeycomb core 82, emission or exit openings through the film and foil layers similar to the openings 48 or 50 of FIG. 3 or 4 permit resin bleeding from the composite panel during the curing process.

Figure 9:
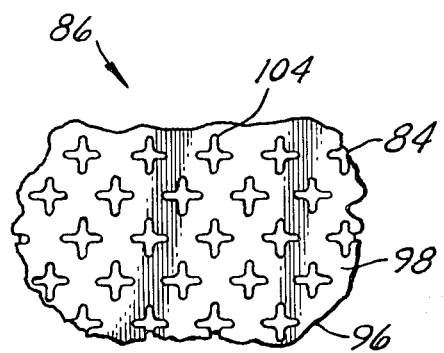
FIG. 9 is a fragmentary plan view of the composite trailing portion of the horizontal stabilizer as taken along the line 9—9 indicated in FIG. 8.

FIG. 9 is a fragmentary plan view of the lightning protection means 86 as taken along the line 9—9 indicated in FIG. 8. The film and foil layers 96 and 98 of the protection means 86 are perforated in this instance with "+" shaped openings 104 to permit resin bleeding from the composite panel 84 during the curing process. These openings 104 are similar to the openings 48 or 50 of FIG. 3 or 4 and would normally be filled with solidified resin after the curing process. The resin generally filling the openings 104 has not been shown in FIG. 8 for clarity of illustration. The "+" shaped openings 104 allow the film and foil layers 96 and 98 to conform to high curvatures in the composite panel 84 either laterally or longitudinally during bonding application prior to curing. After curing, these "+" shaped openings 104 produce an unusually strong locking effect on the film and foil layers 96 and 98 with the solidified resin in such openings engaging the sharp corners thereof. Of course, the "+" shaped openings 104 can be replaced by or used in place of the circular apertures 48 of FIG. 3 or the narrow slots 50 of FIG. 4 as may be desired or required.

Figure 10:
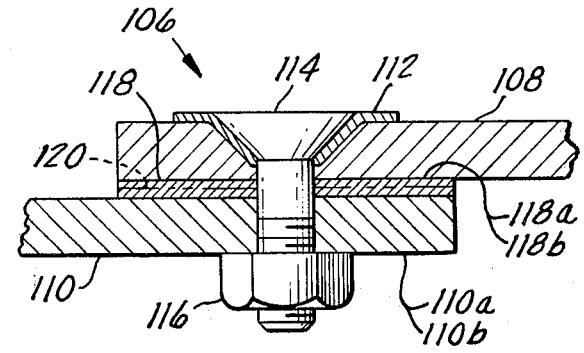
FIG. 10 is a fragmentary sectional view of a composite structural joint which has been rendered less vulnerable to damage from lightning strikes by introduction of an appropriate bonding interface layer in the joint area.

FIG. 10 is a fragmentary sectional view of a composite structural joint 106 which is somewhat similar to the joint portion 92 of FIG. 8. In this instance, however, a composite panel 108 without lightning protection means including dielectric and metal layers on the composite panel is tightly bolted to a panel 110 by a conductive washer 112, bolt 114 and nut 116. The panel 108 can be, for example, a boron, graphite, or other epoxy type of electrically semiconductive composite structure. The panel 110 can be a metal panel 110a or a composite panel 110b and, in either case, the joint 106 includes bonding interface layer 118. In a conductive joint protection method, the interface layer 118 can be a graphite composite layer 118a with a thin conductive chemical coating or a thin metal plating. In a semi-isolation joint protection method, the interface layer 118 can be a thin dielectric film 118b.

In the conductive joint protection method, the following fabrication procedure will achieve the objective of exposing the composite filaments to lightning current conduction and making the composite surface more conductive. First, an extra layer 118a of, for example, graphite composite is introduced in the bonding interface area between the composite panel 108 and metal panel 110a. This extra layer 118a can be incorporated during the initial laying process of the basic composite panel 108. Second, the resin surface of the graphite composite layer 118a is removed as by sanding to expose the graphite composite filaments. Third, a thin conductive chemical coating such as an alodyne coating or a thin conductive metal plating such as 1 mil thick nickel plate, for example, is applied over the exposed graphite composite filaments. This prepared bonding interface layer 118a can then be mated to the metal panel 110a and tightly fastened together by the washer 112, bolt 114 and nut 116.

Of course, where the prepared interface layer 118a is to be mated with another composite panel 110b, such other composite panel would be similarly prepared so that it can also have a bonding interface layer with a conductive coating or metal plating surface to be secured against that of the first interface layer by the washer 112, bolt 114 and nut 116. The contacting conductive surfaces of these two bonding interface layers are indicated by the phantom line 120 in FIG. 10. It should be noted that all of the resulting conductive joints are noncorrosive. It should be further noted that the extra layer 118a of graphite composite may be optional if the composite panel 108 is a graphite composite panel. The same is true for the other composite panel 110b. The extra layer 118a may not be required if the structural requirement allows the removal of the resin surface and exposing of the graphite filaments in the bonding interface area of the composite panel 108, for example.

In the semi-isolation joint protection method, the bonding interface layer 118 can be a thin dielectric film 118b such as 2 or 3 mils thick Kapton film, for example.

The dielectric film 118b can be resin-bonded integrally on the surface of the interface area of the composite panel 108 during the manufacturing process thereof. Also, the surfaces of the washer 112, bolt 114 and nut 116 are prepared with a chemical process to provide, for example, an alodyne coating thereon so that they are more conductive and noncorrosive. The composite panel 108 and metal panel 110a or other composite panel 110b are then tightly secured together with the dielectric film 118b therebetween by the washer 112, bolt 114 and nut 116. An appropriate number of suitably spaced sets of washers 112, bolts 114 and nuts 116 are, of course, used to fasten the joint 106 throughout its length.

The conductive joint protection method and the semi-insulation joint protection method respectively increase and control the lightning current transfer capability and path in composite-to-metal and composite-to-composite aircraft structural joints. Such protected joints are much less vulnerable to lightning damage in the transfer of lightning current during a lightning strike incident so that there is little likelihood that the strength of these structural joints will be degraded. In the conductive joint protection method, the entire bonding interface area between the composite panel 108 and the metal panel 110a or other composite panel 110b is made conductive for the transfer of lightning current in addition to that conducted by the washer 112, bolt 114 and nut 116. In the semi-insulation joint protection method, the dielectric film 118b and the chemical processing of the washer 112, bolt 114 and nut 116 will control the lightning current transfer path through the bolted interface connection only.

In summary, the lightning protection methods described above will prevent damage in composite-to-metal and composite-to-composite structural joints resulting from the transfer of lightning current therethrough. These protected joints can be used individually according to the lightning protection requirements of specific structural joint designs. The protection methods utilize to advantage the electrically semiconductive (partially conductive) characteristics of composite materials. Finally, these composite structural joints are light-weight, low cost, easily constructed and noncorrosive.

While certain exemplary embodiments of this invention have been described above and shown in the accompanying drawings, it is to be understood that such embodiments are merely illustrative of, and not restrictive on, the broad invention and that we do not desire to be limited in our invention to the specific arrangements or constructions described and shown, for various obvious modifications may occur to persons having ordinary skill in the art.

We claim:

1. For use with structural components of aircraft and other vehicles, lightning protection means comprising:
a layer of dielectric material of predetermined thickness and dielectric strength; and
a layer of metallic material of predetermined thickness and electrical conductivity, said dielectric and metallic layers being affixed together and perforated with openings of predetermined geometry, size and spacing to provide a conformable and lightweight lightning protection means for application to an ordinarily lightning-accessible surface of a structural component to be protected from lightning damage, said dielectric layer being normally affixed to said structural component surface and said metallic layer being accessible to lightning strikes, said metallic layer being of such character that it vaporizes locally when struck by lightning while the rest of said metallic layer transfers the lightning current away from the struck area without damage, and said dielectric layer being of such character that it electrically and thermally isolates said structural component surface to protect it from lightning damage.

2. The invention as defined in claim 1 wherein said structural component includes composite material structure, and said openings in said lightning protection means also serve as emission openings for resin bleeding from said composite material structure during curing thereof.

3. The invention as defined in claim 1 further comprising a layer of environmental protection material of predetermined thickness and dielectric strength applied to cover said metallic layer and openings of said perforated lightning protection means affixed to said structural component surface.

4. The invention as defined in claim 1 wherein said metallic layer includes at least a portion which is of sprayed metal, and further comprising a section of conductive mesh material fused with said sprayed metal to said structural component surface, and attachment means affixed to said mesh material for providing a solid electrical connection with said mesh material.

5. The invention as defined in claim 4 wherein said section of mesh material includes a section of wire screen, said attachment means includes a relatively thin metal plate affixed to at least a part of said section of wire screen, and further comprising means for connecting said metal plate to ground structure whereby a noncorrosive ground connection means capable of conducting lightning current is obtained.

6. For use wiith a layer of sprayed metal on a structural component surface, electrical connection means comprising:
a section of conductive mesh material fused with said sprayed metal layer to said structural component surface; and
attachment means affixed to said mesh material for providing a solid electrical connection with said mesh material.

7. The invention as defined in claim 6 wherein said section of mesh material includes a section of wire screen, and said attachment means includes a relatiively thin metal plate affixed to at least a part of said section of wire screen.

8. The invention as defined in claim 7 wherein said structural component surface includes a dielectric material surface, and further comprising means for connecting said metal plate to ground structure whereby a noncorrosive ground connection means capable of conducting lightning current is obtained.

9. A lightning protected structural joint for mated composite and conductive components, said structural joint comprising:
a bonding interface structure positioned in the joint area between said mated composite and conductive components, said interface structure including a layer of graphite composite material bonded to said composite component, and a relatively thin conductive coating covering exposed graphite filaments of said graphite composite layer and contacting said conductive component; and means for tightly securing said composite component, interface structure and conductive component together.

10. The invention as defined in claim 9 wherein said conductive component is another composite component, and further comprising another bonding interface structure including another layer of graphite composite material bonded to said other composite component, and another relatively thin conductive coating covering exposed graphite filaments of said other graphite composite layer, said thin conductive coatings being positioned to contact each other, and said securing means tightly securing said composite component, interface structures and other composite component together.

11. A lightning protected structural joint for mated composite and conductive components, said structural joint comprising:
   a bonding interface structure positioned in the joint area between said mated composite and conductive components, said interface structure including a layer of normally solid dielectric material bonded to said composite component and contacting said conductive component; and
   means for tightly securing said composite component, interface structure and conductive component together, said securing means including bolting means having a conductive and noncorrosive coating provided thereon.

12. The invention as defined in claim 11 wherein said conductive component is another composite component, and said layer of normally solid dielectric material is bonded to both of said composite components, said securing means tightly securing said composite component, layer of normally solid dielectric material and other composite component together.

13. The invention as defined in claim 11 wherein said layer of normally solid dielectric material comprises a layer of dielectric film material.

14. The invention as defined in claim 12 wherein said layer of normally solid dielectric material comprises a layer of dielectric film material.

15. A lightning protected structural joint for mated composite and conductive components, said structural joint comprising:
   a bonding interface structure positioned in the joint area between said mated composite and conductive components, said interface structure including a layer of electrically conductive filament composite material bonded to said composite component, and a relatively thin conductive coating covering exposed conductive filaments of said electrically conductive filament composite layer and contacting said conductive component; and
   means for tightly securing said composite component, interface structure and conductive component together.

16. The invention as defined in claim 15 wherein said conductive component is another composite component, and further comprising another bonding interface structure including another layer of electrically conductive filament composite material bonded to said other composite component, and another relatively thin conductive coating covering exposed conductive filaments of said other electrically conductive filament composite layer, said thin conductive coatings being positioned to contact each other, and said securing means tightly securing said composite component, interface structures and other composite component together.

* * * * *